United States Patent
Bai et al.

(10) Patent No.: US 12,513,211 B2
(45) Date of Patent: Dec. 30, 2025

(54) DATA ACCESS METHOD FOR OBJECT STORAGE BUCKET AND CLOUD MANAGEMENT PLATFORM

(71) Applicant: Huawei Cloud Computing Technologies Co., Ltd., Guizhou (CN)

(72) Inventors: Pingchang Bai, Chengdu (CN); Zhiyin Chen, Gui'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 26 days.

(21) Appl. No.: 18/743,877

(22) Filed: Jun. 14, 2024

(65) Prior Publication Data

US 2024/0340342 A1 Oct. 10, 2024

Related U.S. Application Data

(63) Continuation of application No. PCT/CN2022/139470, filed on Dec. 16, 2022.

(30) Foreign Application Priority Data

Dec. 16, 2021 (CN) .......................... 202111540737.9
Mar. 31, 2022 (CN) .......................... 202210334998.3

(51) Int. Cl.
*H04L 67/1097* (2022.01)
*H04L 67/52* (2022.01)

(52) U.S. Cl.
CPC .......... *H04L 67/1097* (2013.01); *H04L 67/52* (2022.05)

(58) Field of Classification Search
None
See application file for complete search history.

(56) References Cited

U.S. PATENT DOCUMENTS

| 9,628,563 B2 * | 4/2017 | Bansal ................ H04L 67/1097 |
| 2015/0193465 A1 * | 7/2015 | Schoeffler ........... G06F 3/04842 707/827 |

(Continued)

FOREIGN PATENT DOCUMENTS

| CN | 109117650 A | 1/2019 |
| CN | 109189324 A | 1/2019 |

(Continued)

OTHER PUBLICATIONS

Nordell et al., "Concurrency and locality of content demand", Nov. 22, 2013, IEEE, 2013 International Conference on Smart Communications in Network Technologies (SaCoNeT) (vol. 03, 2013, pp. 1-5) (Year: 2013).*

*Primary Examiner* — Davoud A Zand
(74) *Attorney, Agent, or Firm* — Conley Rose, P.C.

(57) ABSTRACT

A data access method includes that a cloud management platform receives, through an upload interface, first data uploaded by a first client located in a first geographical region, stores the first data in a first object storage bucket in a site located in the first geographical region, and sets a first access domain name for the first data. When the cloud management platform receives a data access request from a second client located in a second geographical region for the first access domain name, the cloud management platform pulls the first data stored in the first object storage bucket to a second object storage bucket in a site located in the second geographical region for access by the second client.

20 Claims, 6 Drawing Sheets

(56) References Cited

U.S. PATENT DOCUMENTS

2016/0248753 A1\* 8/2016 Dictos ....................... G06F 8/65
2020/0326876 A1 10/2020 Tian et al.

FOREIGN PATENT DOCUMENTS

| CN | 111953811 | A | 11/2020 |
| CN | 113626522 | A | 11/2021 |
| WO | 2017166481 | A1 | 10/2017 |

\* cited by examiner

DATA ACCESS METHOD FOR OBJECT STORAGE BUCKET AND CLOUD MANAGEMENT PLATFORM

CROSS-REFERENCE TO RELATED APPLICATIONS

This is a continuation of International Patent Application No. PCT/CN2022/139470 filed on Dec. 16, 2022, which claims priority to Chinese Patent Application No. 202111540737.9 filed on Dec. 16, 2021 and Chinese Patent Application No. 202210334998.3 filed on Mar. 31, 2022. All of the aforementioned patent applications are hereby incorporated by reference in their entireties.

TECHNICAL FIELD

Embodiments of this disclosure relate to the field of cloud technologies, and in particular, to a data access method for an object storage bucket based on a cloud management platform and a cloud management platform.

BACKGROUND

Cloud storage is a concept that extends and evolves from a concept of cloud computing. The cloud storage can achieve a scale effect, improve storage efficiency, and reduce operation and maintenance costs. With development and promotion of cloud storage technologies, more enterprises and individual users choose to store data in a cloud storage system. Performance of the cloud storage system becomes a focus when the users select the cloud storage system.

The cloud storage system may include a plurality of sites deployed in different geographical regions, and data of a tenant may be stored in a site located in a geographical region (a region that the tenant currently accesses). After the tenant moves to another geographical region, if the tenant needs to use the stored data, the tenant needs to manage the geographical region in which the data is located, and needs to manually initiate a migration request, to migrate the data from the site located in the geographical region that the user previously accesses to a site located in the geographical region that the user currently accesses, so as to implement management and subsequent obtaining of the data.

It can be learned that, when the tenant needs to manage the geographical region in which the data is located, the tenant needs to initiate a migration task to implement data migration. In this process, the tenant needs to perform a large quantity of operations. Consequently, user experience is poor.

SUMMARY

Embodiments of this disclosure provide a data access method for an object storage bucket and a cloud management platform. The cloud management platform may replace a tenant to implement automatic data management, to reduce a quantity of operations of the tenant and improve user experience.

A first aspect of embodiments of this disclosure provides a data access method for an object storage bucket based on a cloud management platform. The method includes the following.

When a tenant located in a first geographical region needs to store first data in a cloud, the cloud management platform may provide an upload interface for a first client used by the tenant. Therefore, the tenant may send the first data to the upload interface through the first client, so that the cloud management platform receives, through the upload interface, the first data uploaded by the first client. After receiving the first data, the cloud management platform may determine that the first client used by the tenant is located in the first geographical region, and therefore, may store the first data in a first object storage bucket in a site in the first geographical region, and set a first access domain name for the first data. It should be noted that the first access domain name may be for accessing the first object storage bucket, to obtain the first data in the first object storage bucket.

When the tenant is located in a second geographical region, if the cloud management platform finds that the cloud management platform needs to access the first data, the tenant may input, through a data obtaining interface provided by a second client for the cloud management platform, a data access request for the first access domain name, so that the cloud management platform receives, through the data obtaining interface, a data access request that is sent by the second client. In this case, the cloud management platform may determine, based on the data access request, that the second client needs to access the first data in the first object storage bucket. Therefore, the cloud management platform may pull the first data from the first object storage bucket in the site located in the first geographical region to a second object storage bucket in a site located in the second geographical region. In this case, the tenant may subsequently access the first data in the second object storage bucket through the second client.

It can be learned from the foregoing method that after the cloud management platform receives, through the upload interface, the first data uploaded by the first client located in the first geographical region, the cloud management platform may store the first data in the first object storage bucket in the site located in the first geographical region, and set the first access domain name for the first data. When the cloud management platform receives the data access request that is sent by the second client located in the second geographical region for the first access domain name, the cloud management platform pulls the first data stored in the first object storage bucket to the second object storage bucket in the site located in the second geographical region for access by the second client. In the foregoing process, after the tenant located in the first geographical region uploads the first data to the cloud management platform through the first client, the cloud management platform may store the first data in the first object storage bucket in the site in the first geographical region, and configure the first access domain name for the first data. When the tenant located in the second geographical region needs to access the first data, the tenant only needs to send the data access request for the first access domain name to the cloud management platform, and the cloud management platform may pull the first data from the first object storage bucket to the second object storage bucket in the site in the second geographical region, so that the tenant accesses the first data through the second client. It can be learned that, after receiving a data obtaining request (sent through a client) of the tenant, the cloud management platform may automatically initiate a migration task, to implement data migration between sites in different geographical regions for access by the tenant. Because (the client of) the tenant does not perceive a process of migrating data by the cloud management platform, the cloud management platform may replace the tenant to implement automatic data management, to reduce a quantity of operations of the tenant and improve user experience.

In a possible implementation, the upload interface is further configured to receive second data uploaded by the first client, and a first label of the first data and a second label of the second data that are input by the first client, where the first label is the same as the second label, and the method further includes the following. The cloud management platform stores the second data in a third object storage bucket, and sets a second access domain name for the second data, where the third object storage bucket is set in the site located in the first geographical region, and the cloud management platform pulls the second data corresponding to the second label the same as the first label from the third object storage bucket to a fourth object storage bucket, where the fourth object storage bucket is set in the site located in the second geographical region. In the foregoing implementation, it is assumed that the tenant located in the first geographical region has a requirement for storing the first data and storing the second data. In this case, the tenant may input, through the first client, the second data and the second label of the second data into the upload interface provided by the cloud management platform. The first label of the first data is the same as the second label of the second data, indicating that the first data and the second data are data of a same type. In this case, after receiving the second data sent by the first client, the cloud management platform stores the second data in the third object storage bucket in the site in the first geographical region, and sets the second access domain name for the second data. It should be noted that the second access domain name may be for accessing the third object storage bucket, to obtain the second data in the third object storage bucket. After the cloud management platform enables the second client to access the first data in the second object storage bucket in the site in the second geographical region, because the first data and the second data are the data of the same type, the cloud management platform may further pull the second data from the third object storage bucket in the site in the first geographical region to the fourth object storage bucket in the site in the second geographical region. In this way, synchronization of data of a same type between the site in the first geographical region and the site in the second geographical region can be completed, so that the site in the second geographical region pre-stores the second data uploaded by the tenant. If the tenant further needs to access the second data when the tenant is in the second geographical region, the requirement of the tenant can be met.

In a possible implementation, the method further includes the following. The cloud management platform pulls the first data stored in the first object storage bucket in the site in the first geographical region to a fifth object storage bucket, where the fifth object storage bucket is set in a site located in the third geographical region, and the cloud management platform removes the first data stored in the first object storage bucket and the first data stored in the second object storage bucket, where the site located in the third geographical region is a central site, and the site located in the first geographical region and the site located in the second geographical region are edge sites. In the foregoing implementation, after the cloud management platform enables the second client to access the first data in the second object storage bucket in the site in the second geographical region, because the site located in the first geographical region and the site located in the second geographical region are the edge sites, a property that the sites store the data is that the data is removed immediately after being used, and the first data has been used, the cloud management platform may pull the first data from the first object storage bucket in the site in the first geographical region to the fifth object storage bucket in the site in the third geographical region. The site located in the third geographical region is the central site, and a property that the site stores the data is persistent storage. Then, the cloud management platform removes the first data stored in the first object storage bucket in the site in the first geographical region and the first data stored in the second object storage bucket in the site located in the second geographical region.

In a possible implementation, the method further includes the following. If the tenant located in the first geographical region further has a scheduling requirement for the first data, the tenant may input, through the first client, a scheduling policy for the first data into a scheduling policy configuration interface provided by the cloud management platform, so that the cloud management platform receives the scheduling policy through the scheduling policy configuration interface.

In a possible implementation, the scheduling policy includes a label association policy, and the label association policy records the first label of the first data, and the method further includes the following. The cloud management platform pulls, to the object storage bucket in the site in the first geographical region according to the label association policy, data that is stored in an object storage bucket in a site, in another geographical region, different from the site in the first geographical region and for which a label the same as the first label is set. In the foregoing implementation, the scheduling policy input by the tenant may include the label association policy, and the label association policy records the first label of the first data. Therefore, after parsing the received scheduling policy, the cloud management platform may obtain the first label, to determine that remaining data of a same type as the first data needs to be associated. In this case, the cloud management platform may determine, in other regions than the first geographical region, geographical regions in which object storage buckets in sites store data whose labels are the same as the first label, pull the data to other object storage buckets in the site in the first geographical region than the first object storage bucket for storage, and set access domain names for the data.

In a possible implementation, the scheduling policy further includes a time policy, and the time policy records scheduling time, and the method further includes the following. The cloud management platform pulls, to the object storage bucket in the site in the first geographical region at the scheduling time according to the time policy, the data that is stored in the object storage bucket in the site, in the another geographical region, different from the site in the first geographical region and for which the label the same as the first label is set. In the foregoing implementation, the scheduling policy input by the tenant further includes the time policy, and the time policy records the scheduling time. In this case, the cloud management platform may determine, in other regions than the first geographical region, geographical regions in which object storage buckets in sites store data whose labels are the same as the first label, pull, at the scheduling time, the data to other object storage buckets in the site in the first geographical region than the first object storage bucket for storage, and set access domain names for the data.

In a possible implementation, the scheduling policy is further for specifying a target site of the first data, and the method further includes the following. If the tenant inputs, into the scheduling policy configuration interface through the first client, the target site specified by the tenant, the cloud management platform stores the first data in an object storage bucket in the target site, to meet a directional data storage requirement of the tenant. It may be understood that the target site herein may be a site located in the first geographical region, or may be a site located in another geographical region.

In a possible implementation, the first label indicates one or any combination of a file type, creation time, a prefix, a suffix, and a size of the first data.

In a possible implementation, the first client and the second client separately use a same account to log in to the cloud management platform, or the first client and the second client separately use mutually associated accounts to log in to the cloud management platform, where the same account or the mutually associated accounts are registered with the cloud management platform.

A second aspect of embodiments of this disclosure provides a cloud management platform. The cloud management platform includes a first providing module configured to provide an upload interface, where the upload interface is configured to receive first data uploaded by a first client, and the first client is located in a first geographical region, a first storage module configured to store the first data in a first object storage bucket, and set a first access domain name for the first data, where the first object storage bucket is set in a site located in the first geographical region, a receiving module configured to receive a data access request that is sent by a second client for the first access domain name, where the second client is located in a second geographical region, and a first pulling module configured to pull first data stored in a first object storage bucket to a second object storage bucket for access by the second client, where the second object storage bucket is set in a site located in the second geographical region.

It can be learned from the foregoing cloud management platform that after the cloud management platform receives, through the upload interface, the first data uploaded by the first client located in the first geographical region, the cloud management platform may store the first data in the first object storage bucket in the site located in the first geographical region, and set the first access domain name for the first data. When the cloud management platform receives the data access request that is sent by the second client located in the second geographical region for the first access domain name, the cloud management platform pulls the first data stored in the first object storage bucket to the second object storage bucket in the site located in the second geographical region for access by the second client. In the foregoing process, after a tenant located in the first geographical region uploads the first data to the cloud management platform through the first client, the cloud management platform may store the first data in the first object storage bucket in the site in the first geographical region, and configure the first access domain name for the first data. When the tenant located in the second geographical region needs to access the first data, the tenant only needs to send the data access request for the first access domain name to the cloud management platform, and the cloud management platform may pull the first data from the first object storage bucket to the second object storage bucket in the site in the second geographical region, so that the tenant accesses the first data through the second client. It can be learned that, after receiving a data obtaining request (sent through a client) of the tenant, the cloud management platform may automatically initiate a migration task, to implement data migration between sites in different geographical regions for access by the tenant. Because (the client of) the tenant does not perceive a process of migrating data by the cloud management platform, the cloud management platform may replace the tenant to implement automatic data management, to reduce a quantity of operations of the tenant and improve user experience.

In a possible implementation, the upload interface is further configured to receive second data uploaded by the first client, and a first label of the first data and a second label of the second data that are input by the first client, where the first label is the same as the second label, and the cloud management platform further includes a second storage module configured to store the second data in a third object storage bucket, and set a second access domain name for the second data, where the third object storage bucket is set in the site located in the first geographical region, and a second pulling module configured to pull the second data corresponding to the second label the same as the first label from the third object storage bucket to a fourth object storage bucket, where the fourth object storage bucket is set in the site located in the second geographical region.

In a possible implementation, the cloud management platform further includes a third pulling module configured to pull the first data stored in the first object storage bucket in the site in the first geographical region to a fifth object storage bucket, where the fifth object storage bucket is set in a site located in a third geographical region, and a removal module configured to remove the first data stored in the first object storage bucket and the first data stored in the second object storage bucket, where the site located in the third geographical region is a central site, and the site located in the first geographical region and the site located in the second geographical region are edge sites.

In a possible implementation, the cloud management platform further includes a second providing module configured to provide a scheduling policy configuration interface, where the scheduling policy configuration interface is configured to obtain a scheduling policy that is sent by the first client for the first data.

In a possible implementation, the scheduling policy includes a label association policy, and the label association policy records a first label of the first data, and the cloud management platform further includes a fourth pulling module configured to pull, to the object storage bucket in the site in the first geographical region according to the label association policy, data that is stored in an object storage bucket in a site, in another geographical region, different from the site in the first geographical region and for which a label the same as the first label is set.

In a possible implementation, the first label indicates one or any combination of a file type, creation time, a prefix, a suffix, and a size of the first data.

In a possible implementation, the scheduling policy further includes a time policy, and the time policy records scheduling time, and the cloud management platform further includes a fifth pulling module configured to pull, to the object storage bucket in the site in the first geographical region at the scheduling time according to the time policy, the data that is stored in the object storage bucket in the site, in the another geographical region, different from the site in the first geographical region and for which the label the same as the first label is set.

In a possible implementation, the scheduling policy is further for specifying a target site of the first data, and the cloud management platform further includes a third storage module configured to store the first data in an object storage bucket in the target site.

In a possible implementation, the first client and the second client separately use a same account to log in to the cloud management platform, or the first client and the second client separately use mutually associated accounts to log in to the cloud management platform, where the same account or the mutually associated accounts are registered with the cloud management platform.

A third aspect of embodiments of this disclosure provides a cloud management platform. The cloud management platform includes a memory and a processor. The memory stores code, the processor is configured to execute the code, and when the code is executed, the cloud management platform performs the method according to any one of the first aspect or the possible implementations of the first aspect.

A fourth aspect of embodiments of this disclosure provides a computer storage medium. The computer storage medium stores a computer program, and when the program is executed by a computer, the computer is enabled to perform the method according to any one of the first aspect or the possible implementations of the first aspect.

A fifth aspect of embodiments of this disclosure provides a computer program product. The computer program product stores instructions, and when the instructions are executed by a computer, the computer is enabled to perform the method according to any one of the first aspect or the possible implementations of the first aspect.

In embodiments of this disclosure, after the cloud management platform receives, through the upload interface, the first data uploaded by the first client located in the first geographical region, the cloud management platform may store the first data in the first object storage bucket in the site located in the first geographical region, and set the first access domain name for the first data. When the cloud management platform receives the data access request that is sent by the second client located in the second geographical region for the first access domain name, the cloud management platform pulls the first data stored in the first object storage bucket to the second object storage bucket in the site located in the second geographical region for access by the second client. In the foregoing process, after the tenant located in the first geographical region uploads the first data to the cloud management platform through the first client, the cloud management platform may store the first data in the first object storage bucket in the site in the first geographical region, and configure the first access domain name for the first data. When the tenant located in the second geographical region needs to access the first data, the tenant only needs to send the data access request for the first access domain name to the cloud management platform, and the cloud management platform may pull the first data from the first object storage bucket to the second object storage bucket in the site in the second geographical region, so that the tenant accesses the first data through the second client. It can be learned that, after receiving the data obtaining request (sent through the client) of the tenant, the cloud management platform may automatically initiate the migration task, to implement data migration between the sites in the different geographical regions for access by the tenant. Because (the client of) the tenant does not perceive the process of migrating the data by the cloud management platform, the cloud management platform may replace the tenant to implement automatic data management, to reduce the quantity of operations of the tenant and improve user experience.

DESCRIPTION OF EMBODIMENTS

Figure 1:
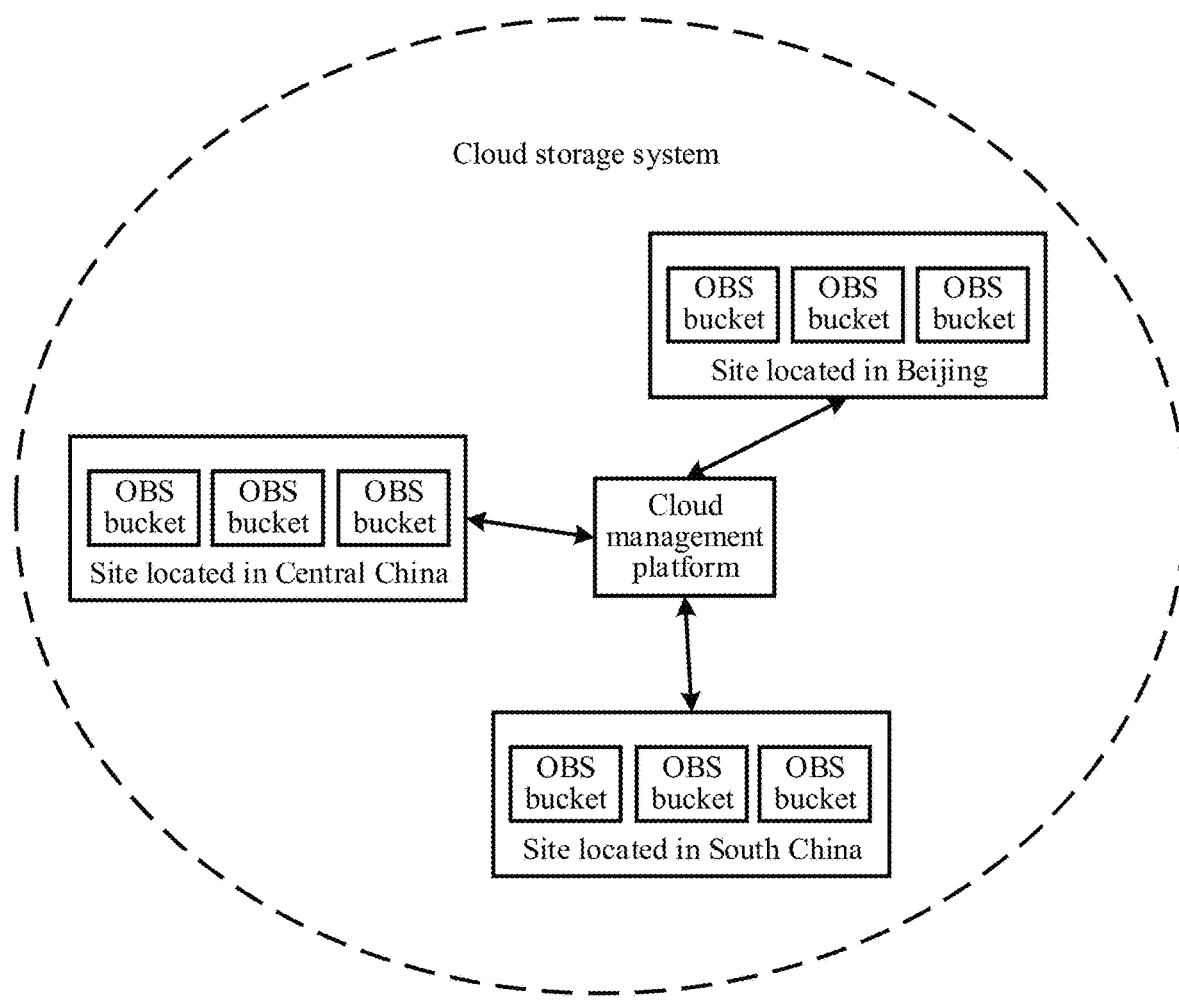
FIG. 1 is a schematic diagram of a structure of a cloud storage system according to an embodiment of this disclosure.

Embodiments of this disclosure provide a data access method for an object storage bucket and a cloud management platform. The cloud management platform may replace a tenant to implement automatic data management, to reduce a quantity of operations of the tenant and improve user experience.

In the specification, the claims, and the accompanying drawings of this disclosure, the terms "first", "second", and the like are intended to distinguish between similar objects but do not necessarily indicate a specific order or sequence. It should be understood that the terms used in such a way are interchangeable in appropriate circumstances. This is merely a discrimination manner that is used when objects having a same attribute are described in embodiments of this disclosure. In addition, the terms "include", "contain" and any other variants mean to cover a non-exclusive inclusion, so that a process, a method, a system, a product, or a device that includes a series of units is not necessarily limited to those units, but may include other units not expressly listed or inherent to such a process, method, product, or device.

Cloud storage is a concept that extends and evolves from a concept of cloud computing. The cloud storage can achieve a scale effect, improve storage efficiency, and reduce operation and maintenance costs. With development and promotion of cloud storage technologies, more enterprises and individual users choose to store data in a cloud storage system. Performance of the cloud storage system becomes a focus when the users select the cloud storage system.

The cloud storage system may include a plurality of sites deployed in different geographical regions (for example, a site located in South China and a site located in Central China). Data of a tenant (for example, an enterprise providing an application and a user using an application) may be stored in a site located in a geographical region (a region that the tenant currently accesses). Therefore, the cloud storage system may provide a cloud storage service for the tenant in each geographical region. After the tenant moves to another geographical region, if the tenant needs to use the stored data, the tenant needs to manage the geographical region in which the data is located, and needs to manually initiate a migration request, to migrate the data from the site located in the geographical region that the user previously accesses to a site located in the geographical region that the user currently accesses, to implement management and subsequent obtaining of the data.

It can be learned that, when the tenant needs to manage the geographical region in which the data is located, the tenant needs to initiate a migration task to implement data migration. In this process, the tenant needs to perform a large quantity of operations (for example, the tenant needs to manually configure information about the geographical region and information about the site). Consequently, user experience is poor.

Further, usually, data of a tenant can be stored only in a site located in a specific region. Once the tenant or another tenant needs to use the data, data migration usually needs to be implemented inside the cloud storage system. Consequently, a data obtaining speed is low and data processing duration is excessively long.

To resolve the foregoing problem, an embodiment of this disclosure provides a cloud storage system. As shown in FIG. 1 (where FIG. 1 is a schematic diagram of a structure of a cloud storage system according to an embodiment of this disclosure), the cloud storage system includes a plurality of sites located (deployed) in different geographical regions and a cloud management platform that manages the plurality of sites. It should be noted that the site mentioned herein may be understood as a concept such as a region, an availability zone (AZ), or a data center (DC) in the field of cloud technologies. For example, the cloud storage system includes a site located in South China, a site located in Central China, a site located in Beijing, and a cloud management platform that manages the three sites.

For a site in any geographical region, the site is usually a physical server cluster. Based on a virtualization technology, the site can be used to deploy an object storage service (OBS) bucket that provides a data storage service (where it should be noted that an OBS bucket mentioned in the following may also be understood as the foregoing object storage bucket). The cloud management platform is usually far away from the plurality of sites (that is, there is a specific distance between the cloud management platform and the plurality of sites). The cloud management platform may centrally manage OBS buckets in the sites. In other words, the cloud management platform may centrally manage OBS buckets in all sites in the entire cloud storage system. When a client of a tenant accesses the cloud management platform, the cloud management platform may invoke a site that is geographically close to the client of the tenant, to provide an OBS service for the client of the tenant.

Figure 2:
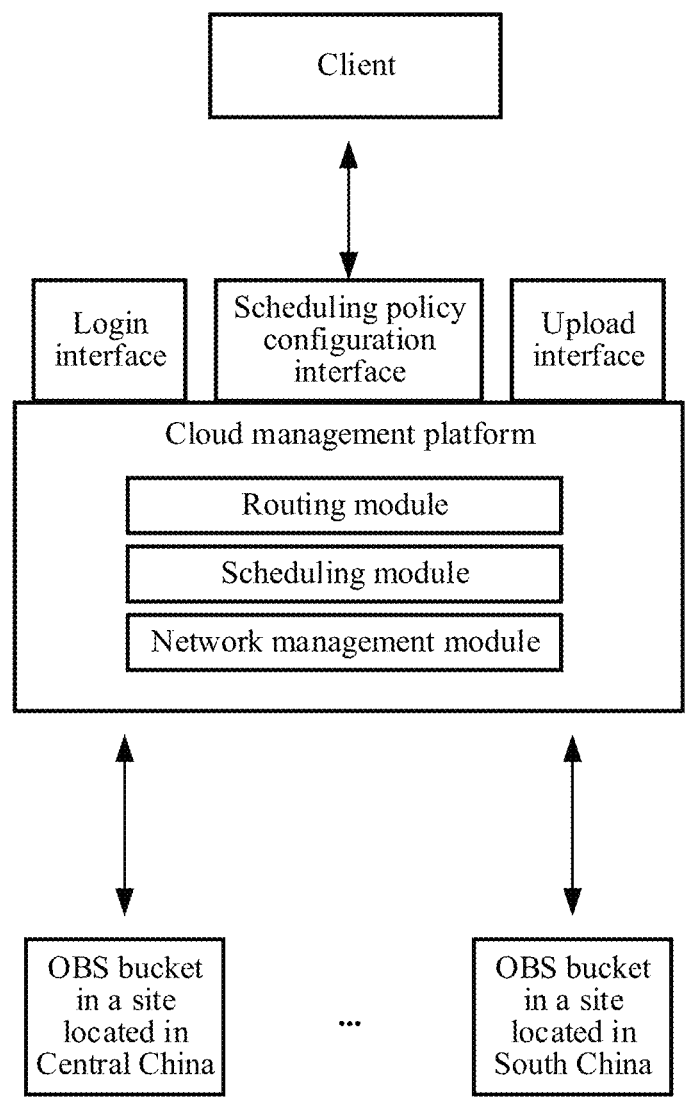
FIG. 2 is a schematic diagram of a cloud management platform according to an embodiment of this disclosure.

As shown in FIG. 2 (where FIG. 2 is a schematic diagram of a cloud management platform according to an embodiment of this disclosure), the cloud management platform may externally provide a plurality of application programming interfaces (APIs), for example, a login interface, an upload interface, a data obtaining interface, and a scheduling policy configuration interface. The cloud management platform may receive, through the login interface, a tenant account and a tenant password (an account and a password that have been registered with the cloud management platform) sent by a client of a tenant, and perform identity authentication on the information. After the authentication is successful, the client is allowed to log in to the cloud management platform. The cloud management platform may further receive, through the data obtaining interface, a data access request of the client of the tenant, obtain, based on the request, data indicated by the request, and return, through the data obtaining interface, the data to the client of the tenant. The cloud management platform may further receive, through the upload interface, data uploaded by the client of the tenant, and store the data. The cloud management platform may further receive, through the scheduling policy configuration interface, a scheduling policy sent by the client of the tenant, to complete, according to the scheduling policy, data management in a plurality of sites.

The cloud management platform may further include a routing module, a scheduling module, and a network management module. The routing module may be configured to automatically route to (track), based on the data access request, a location of data (where for example, the data is located in an OBS bucket in a site). The scheduling module may be configured to automatically generate a scheduling policy, to manage the data according to the scheduling policy. In this way, a data management process runs silently in a background, and is not perceived by the tenant. The network management module may be configured to implement network management, bandwidth utilization control, and the like between a plurality of geographical regions.

The cloud management platform may further manage each site, for example, create an OBS bucket in a site to store data uploaded by the client of the tenant, for another example, pull (migrate) data from an OBS bucket in a site located in a geographical region to an OBS bucket in a site located in another geographical region, for still another example, read data from an OBS bucket in a site and send the data to the client of the tenant.

Figure 3:
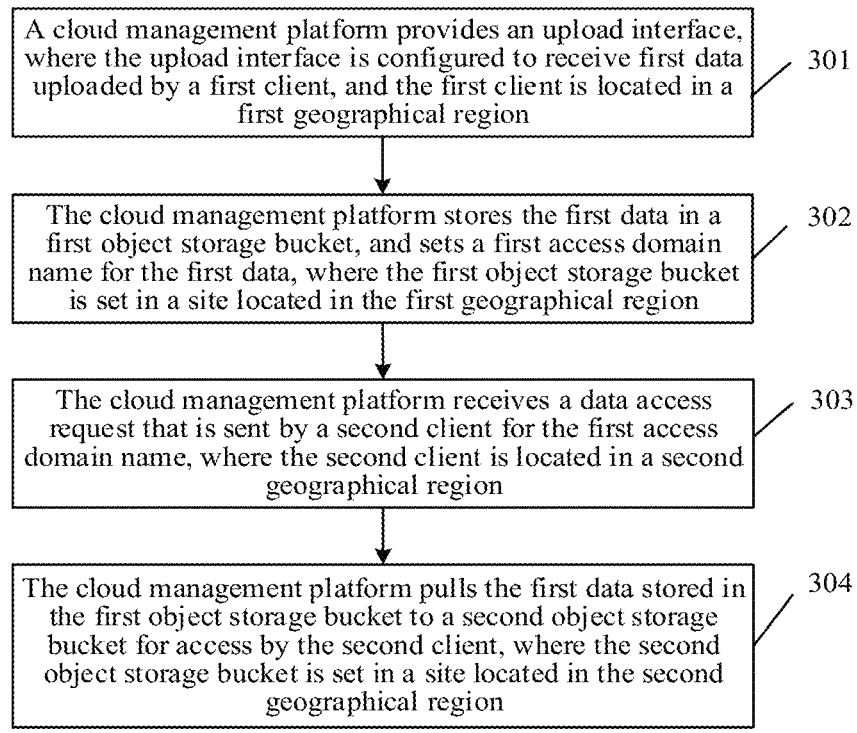
FIG. 3 is a schematic flowchart of a data access method for an object storage bucket based on a cloud management platform according to an embodiment of this disclosure.

To further understand a working process of the cloud storage system, the following describes the working process from two aspects. The first aspect is a data obtaining process, and the second aspect is a data uploading and data scheduling process. The following first describes the first aspect. FIG. 3 is a schematic flowchart of a data access method for an object storage bucket based on a cloud management platform according to an embodiment of this disclosure. As shown in FIG. 3, the method includes the following steps.

Step 301: The cloud management platform provides an upload interface, where the upload interface is configured to receive first data uploaded by a first client, and the first client is located in a first geographical region.

Step 302: The cloud management platform stores the first data in a first object storage bucket, and sets a first access domain name for the first data, where the first object storage bucket is set in a site located in the first geographical region.

In this embodiment, when a tenant located in the first geographical region needs to store the first data in a cloud, the cloud management platform may provide the upload interface (for example, a data input field of a user interface) for a first client used by the tenant. Therefore, the tenant may send the first data to the upload interface through the first client, so that the cloud management platform receives, through the upload interface, the first data uploaded by the first client. After receiving the first data, the cloud management platform may determine that the first client used by the tenant is located in the first geographical region, and therefore, may store the first data may in a first OBS bucket (that is, the foregoing first object storage bucket) in the site in the first geographical region, and set the first access domain name for the first data. It should be noted that the first access domain name may be for accessing the first OBS bucket, to obtain the first data in the first OBS bucket.

Further, when the tenant uploads the first data, the cloud management platform may further provide a scheduling policy configuration interface (for example, a scheduling policy input field of the user interface). If the tenant does not input a specified target site into the scheduling policy configuration interface through the first client, the cloud management platform may automatically allocate, to the first data, a site storing the first data, that is, a site in the first geographical region in which the first client is located.

Figure 4:
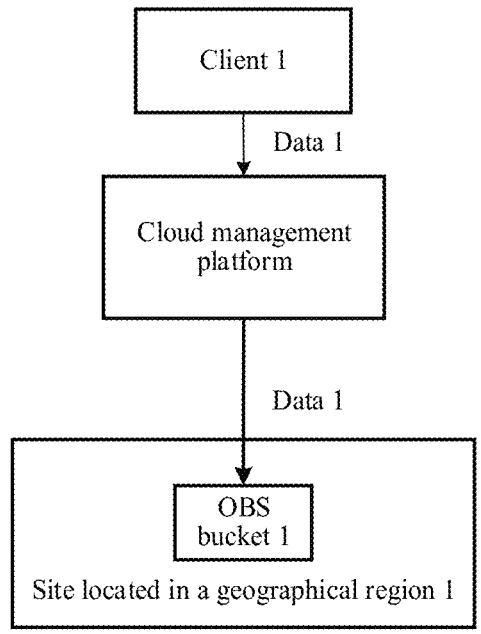
FIG. 4 is another schematic diagram of a structure of a cloud storage system according to an embodiment of this disclosure.

For example, as shown in FIG. 4 (where FIG. 4 is another schematic diagram of a structure of a cloud storage system according to an embodiment of this disclosure), when a user 1 located in a geographical region 1 uses an application, data 1 is generated (where for example, the user 1 writes a document by using office software). If the user 1 needs to upload the data 1 to the cloud storage system for storage, the cloud management platform may provide a user interface for a client 1 (for example, a browser used by the user 1) of the user 1, where the user interface includes a data input field, and the user 1 may input the data 1 into the input field through the client 1, to upload the data 1 to the cloud management platform. When the data is uploaded, the user interface further includes a scheduling policy input field, but the user 1 may not input, into the input field through the client 1, a site specified by the user 1, in other words, the user 1 does not need to specify a data center located in a geographical region. The cloud management platform may automatically allocate the site located in the geographical region 1 to the user 1, and store the data 1 in an OBS bucket 1 in the site. In addition, the cloud management platform may further configure an access domain name for the data 1, that is, www.bucketname.obs11.com. "obs11" in the access domain name corresponds to the OBS bucket 1 in the site in the geographical region 1.

If the tenant inputs, into the scheduling policy configuration interface through the first client, the target site specified by the tenant, the cloud management platform stores the first data in an object storage bucket in the target site, to meet a directional data storage requirement of the tenant. It may be understood that the target site herein may be the site located in the first geographical region, or may be a site located in another geographical region. This is not limited.

Further, when the tenant uploads the first data, the tenant may further input a first label of the first data into the upload interface through the first client, where the first label of the first data includes at least one of the following: creation time of the first data (for example, time when software to which the first data belongs generates the first data), a file type of the first data (where for example, the first data is a picture, a video, or a text), an application type to which the first data belongs (that is, a prefix and a suffix of the first data, where for example, an application to which the first data belongs is an ANDROID application, an IOS application, or a GOOGLE application), a size of the first data, and the like. Still using the foregoing example, it is assumed that the data 1 is a document made by the user 1 by using the office software. In this case, an identifier of the data 1 may include: time when the office software generates the data 1, a document type of the data 1, the office software being an application that belongs to an ANDROID system, a size of 5 M of the data 1, and the like.

Step 303: The cloud management platform receives a data access request that is sent by a second client for the first access domain name, where the second client is located in a second geographical region.

Step 304: The cloud management platform pulls the first data stored in the first object storage bucket to a second object storage bucket for access by the second client, where the second object storage bucket is set in a site located in the second geographical region.

When the tenant is located in the second geographical region, if the cloud management platform finds that the cloud management platform needs to access the first data, the tenant may input, through a data obtaining interface (for example, a domain name input field of a user interface) provided by the second client for the cloud management platform, the data access request for the first access domain name (where to be specific, the data access request includes the first access domain name, or the data access request is generated based on the first access domain name), so that the cloud management platform receives, through the data obtaining interface, the data access request that is sent by the second client. In this case, the cloud management platform may determine, based on the data access request, that the second client needs to access the first data in the first OBS bucket. Therefore, the cloud management platform may pull the first data from the first OBS bucket in the site located in the first geographical region to a second OBS bucket (that is, the foregoing second object storage bucket) located in the site the second geographical region, the tenant may subsequently access the first data in the second OBS bucket through the second client (where for example, if the data access request indicates that an operation that needs to be implemented by the second client is a data read operation, the cloud management platform may provide the first data stored in the second OBS bucket for the second client, so that the user uses the first data, for another example, if the data access request indicates that an operation that needs to be implemented by the second client is a data write operation, the cloud management platform may open a permission or an interface to the second client, so that the tenant modifies, through the second client, the first data stored in the second OBS bucket).

Figure 5:
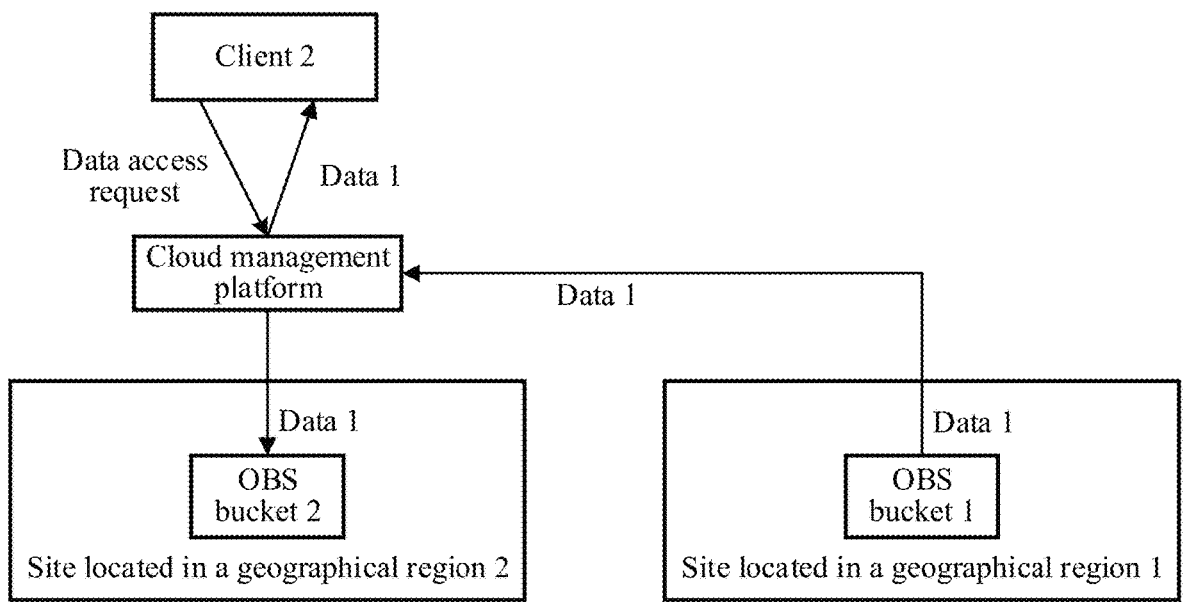
FIG. 5 is another schematic diagram of a structure of a cloud storage system according to an embodiment of this disclosure.

For example, as shown in FIG. 5 (where FIG. 5 is another schematic diagram of a structure of a cloud storage system according to an embodiment of this disclosure, and FIG. 5 is obtained through drawing based on FIG. 4), when the user 1 located in a geographical region 2 needs to access the data 1, a data access request may be sent to the cloud management platform through a client 2 (for example, cloud storage software used by the user 1), where the request includes an access domain name www.bucketname.obs11.com. In this case, the cloud management platform may pull the data 1 from the OBS bucket 1 in the site located in the geographical region 1 to an OBS bucket 2 in a site located in the geographical region 2 for storage. Because the data access request indicates that an operation to be implemented by the client 2 is a data read operation, the cloud management platform may provide the data 1 in the OBS bucket 2 for the client 2, so that the user 1 uses the data 1.

It should be noted that the first client and the second client are different clients used by a same tenant (for example, an individual user or a plurality of users that are in an enterprise and that are located at different geographical locations). Therefore, when the tenant separately uses the first client and the second client to log in to the cloud management platform, the tenant uses a same account or mutually associated accounts (for example, a parent account and a sub-account), and these accounts have been registered with the cloud management platform and are available accounts.

In addition, based on FIG. 3, the cloud management platform may implement data management according to a scheduling policy of the cloud management platform, or may implement data management according to a scheduling policy of the tenant. Details are separately provided below.

In a first case, the cloud management platform implements data management according to the scheduling policy of the cloud management platform.

(1) After the foregoing step 302 is completed, it is assumed that the tenant located in the first geographical region further has a requirement for storing second data. In this case, the tenant may input, through the first client, the second data and a second label of the second data into the upload interface provided by the cloud management platform. The first label of the first data is the same as a second label of the second data, indicating that the first data and the second data are data of a same type. For descriptions of uploading, by the tenant, the second data and the second label of the second data through the first client, refer to the foregoing related descriptions of uploading, by the tenant, the first data and the first label of the first data through the first client. Details are not described herein again. It should be understood that the tenant may upload the first data and the first label, and the second data and the second label at the same time.

In this case, after receiving the second data sent by the first client, the cloud management platform stores the second data in a third OBS bucket (that is, the foregoing third object storage bucket) in the site in the first geographical region, and sets a second access domain name for the second data. It should be noted that the second access domain name may be for accessing the third OBS bucket, to obtain the second data in the third OBS bucket.

After the foregoing step 304 is completed, because the first data and the second data are the data of the same type, the cloud management platform may further pull the second data from the third OBS bucket in the site in the first geographical region to a fourth OBS bucket (that is, the foregoing fourth object storage bucket) in the site in the second geographical region. In this way, synchronization of data of a same type between the site in the first geographical region and the site in the second geographical region can be completed, so that the site in the second geographical region pre-stores the second data uploaded by the tenant. If the tenant further needs to access the second data when the tenant is in the second geographical region, the requirement of the tenant can be met.

Figure 6:
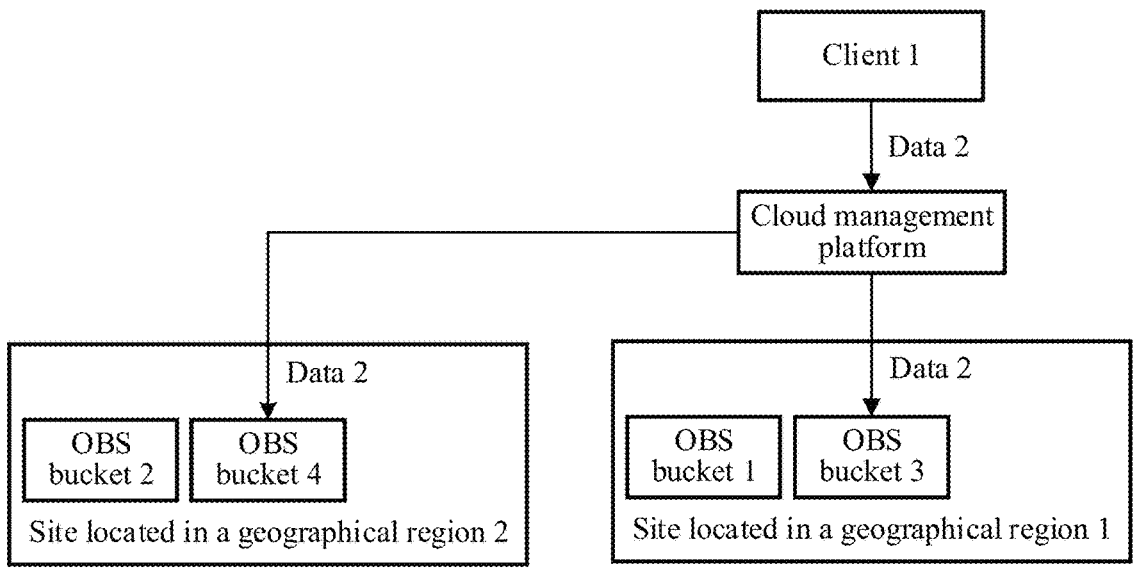
FIG. 6 is another schematic diagram of a structure of a cloud storage system according to an embodiment of this disclosure.

For example, as shown in FIG. 6 (where FIG. 6 is another schematic diagram of a structure of a cloud storage system according to an embodiment of this disclosure, and FIG. 6 is obtained through drawing based on FIG. 5), after the cloud management platform provides, for the client 2, the data 1 in the OBS bucket 2 in the site located in the geographical region 2, because an OBS bucket 3 in the site located in the geographical region 1 already stores data 2 uploaded by the user 1, and a label of the data 1 is the same as that of the data 2 (that is, the data 1 and the data 2 are data of a same type), the cloud management platform may pull the data 2 from the OBS bucket 3 in the site located in the geographical region 1 to an OBS bucket 4 in the site located in the geographical region 2 for storage. If the user 1 further has a requirement for using the data 2, the cloud management platform may quickly and directly provide the data 2 in the OBS bucket 4 for the client 2, so that the user 1 uses the data 2.

(2) After the foregoing step 304 is completed, because the site located in the first geographical region and the site located in the second geographical region are edge sites, a property that the sites store the data is that the data is removed immediately after being used, and the first data has been used, the cloud management platform may pull the first data from the first OBS bucket in the site in the first geographical region to a fifth OBS bucket (that is, the foregoing fifth object storage bucket) in a site located in a third geographical region. The site located in the third geographical region is a central site, and a property that the site stores the data is persistent storage. Then, the cloud management platform removes the first data stored in the first OBS bucket in the site in the first geographical region and the first data stored in the second OBS bucket in the site located in the second geographical region.

Still using the example shown in FIG. 5, it is assumed that the site in the geographical region 1 is a site in Shenzhen, the site in the geographical region 2 is a site in Guangzhou, and both the sites are edge sites, a site in a geographical region 3 is a site in South China, and the site is a central site. After the cloud management platform provides the data 1 in the OBS bucket 2 in the site located in the geographical region 2 for the client 2, the cloud management platform may pull the data 1 to an OBS bucket 5 in the site located in the geographical region 3 for storage, and remove the data 1 in the OBS bucket 1 in the site located in the geographical region 1 and the data 1 in the OBS bucket 2 in the site located in the geographical region 2.

In a second case, the cloud management platform implements data management according to the scheduling policy of the tenant.

After the foregoing step 302 is completed, it is assumed that the tenant located in the first geographical region further has a scheduling requirement for the first data, and the tenant may input, through the first client, a scheduling policy for the first data into a scheduling policy configuration interface provided by the cloud management platform, so that the cloud management platform receives the scheduling policy through the scheduling policy configuration interface. It should be understood that the tenant may input the scheduling policy and upload the first data and the first label at the same time.

Further, the scheduling policy may include a label association policy, and the label association policy records the first label of the first data. Therefore, after parsing the received scheduling policy, the cloud management platform may obtain the first label, to determine that remaining data of a same type as the first data needs to be associated. In this case, the cloud management platform may determine, in other regions than the first geographical region, geographical regions in which OBS buckets in sites store data whose labels are the same as the first label, pull the data to other OBS buckets in the site in the first geographical region than the first OBS bucket for storage, and set access domain names for the data.

Figure 7:
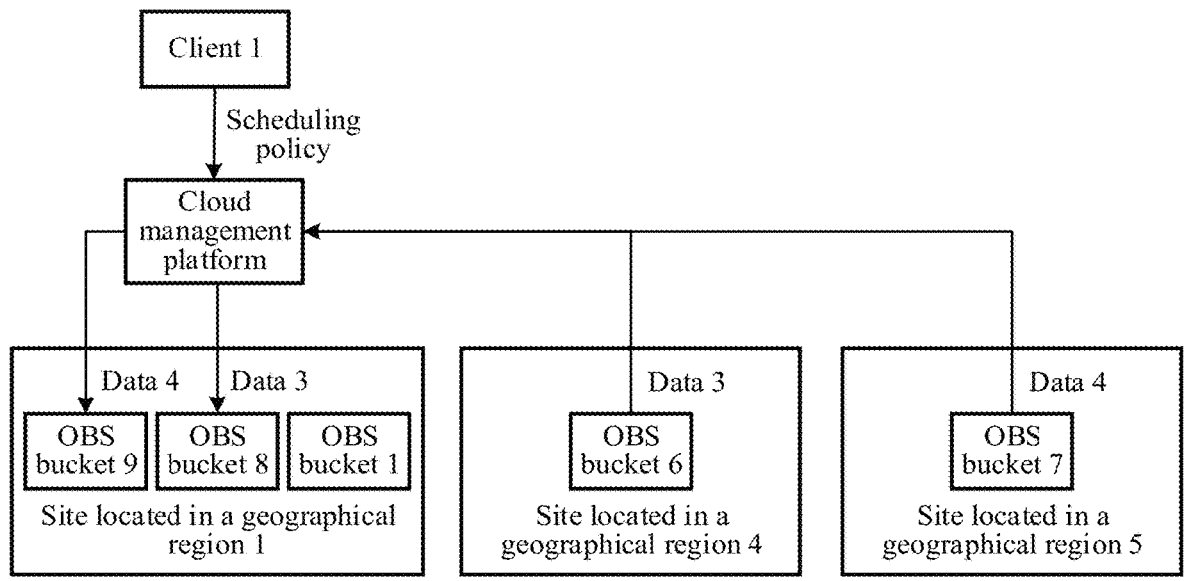
FIG. 7 is another schematic diagram of a structure of a cloud storage system according to an embodiment of this disclosure.

For example, as shown in FIG. 7 (where FIG. 7 is another schematic diagram of a structure of a cloud storage system according to an embodiment of this disclosure, and FIG. 7 is obtained through drawing based on FIG. 4), when the cloud management platform determines that a scheduling policy from a client 1 includes a label of data 1, the cloud management platform first determines data 3 in an OBS bucket 6 in a site located in a geographical region 4 and data 4 in an OBS bucket 7 in a site located in a geographical region 5. Labels of the two pieces of data are the same as the label of the data 1. Therefore, the cloud management platform may pull the data 3 from the OBS bucket 6 in the site located in the geographical region 4 to an OBS bucket 8 in a site located in a geographical region 1 for storage, and pull the data 4 from the OBS bucket 7 in the site located in the geographical region 5 to an OBS bucket 9 in the site located in the geographical region 1 for storage.

Further, the scheduling policy further includes a time policy, and the time policy records scheduling time. Therefore, the cloud management platform may determine, in other regions than the first geographical region, geographical regions in which OBS buckets in sites store data whose labels are the same as the first label, pull, at the scheduling time, the data to other OBS buckets in the site in the first geographical region than the first OBS bucket for storage, and set access domain names for the data.

In embodiments of this disclosure, after the cloud management platform receives, through the upload interface, the first data uploaded by the first client located in the first geographical region, the cloud management platform may store the first data in the first object storage bucket in the site located in the first geographical region, and set the first access domain name for the first data. When the cloud management platform receives the data access request that is sent by the second client located in the second geographical region for the first access domain name, the cloud management platform pulls the first data stored in the first object storage bucket to the second object storage bucket in the site located in the second geographical region for access by the second client. In the foregoing process, after the tenant located in the first geographical region uploads the first data to the cloud management platform through the first client, the cloud management platform may store the first data in the first object storage bucket in the site in the first geographical region, and configure the first access domain name for the first data. When the tenant located in the second geographical region needs to access the first data, the tenant only needs to send the data access request for the first access domain name to the cloud management platform, and the cloud management platform may pull the first data from the first object storage bucket to the second object storage bucket in the site in the second geographical region, so that the tenant accesses the first data through the second client. It can be learned that, after receiving a data obtaining request (sent through a client) of the tenant, the cloud management platform may automatically initiate a migration task, to implement data migration between sites in different geographical regions for access by the tenant. Because (the client of) the tenant does not perceive a process of migrating data by the cloud management platform, the cloud management platform may replace the tenant to implement automatic data management, to reduce a quantity of operations of the tenant and improve user experience.

Further, the cloud management platform may implement data management according to the scheduling policy of the cloud management platform or the scheduling policy of the tenant, to improve flexibility of data deployment and help improve user experience.

Figure 8:
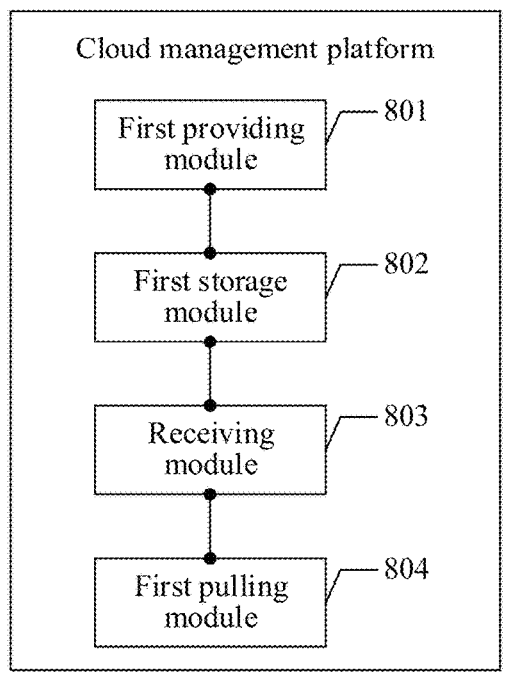
FIG. 8 is a schematic diagram of a structure of a cloud management platform according to an embodiment of this disclosure.

The foregoing describes in detail the data access method for an object storage bucket based on a cloud management platform provided in embodiments of this disclosure. The following describes a cloud management platform provided in embodiments of this disclosure. FIG. 8 is a schematic diagram of a structure of a cloud management platform according to an embodiment of this disclosure. As shown in FIG. 8, the cloud management platform includes a first providing module 801 configured to provide an upload interface, where the upload interface is configured to receive first data uploaded by a first client, and the first client is located in a first geographical region, where for example, the first providing module 801 may be configured to implement step 301 in the embodiment shown in FIG. 3, a first storage module 802 configured to store the first data in a first object storage bucket, and set a first access domain name for the first data, where the first object storage bucket is set in a site located in the first geographical region, where the first storage module 802 may be configured to implement step 302 in the embodiment shown in FIG. 3, a receiving module 803 configured to receive a data access request that is sent by a second client for the first access domain name, where the second client is located in a second geographical region, where the receiving module 803 may be configured to implement step 303 in the embodiment shown in FIG. 3, and a first pulling module 804 configured to pull the first data stored in the first object storage bucket to a second object storage bucket for access by the second client, where the second object storage bucket is set in a site located in the second geographical region, where the first pulling module 804 may be configured to implement step 304 in the embodiment shown in FIG. 3.

In embodiments of this disclosure, after the cloud management platform receives, through the upload interface, the first data uploaded by the first client located in the first geographical region, the cloud management platform may store the first data in the first object storage bucket in the site located in the first geographical region, and set the first access domain name for the first data. When the cloud management platform receives the data access request that is sent by the second client located in the second geographical region for the first access domain name, the cloud management platform pulls the first data stored in the first object storage bucket to the second object storage bucket in the site located in the second geographical region for access by the second client. In the foregoing process, after a tenant located in the first geographical region uploads the first data to the cloud management platform through the first client, the cloud management platform may store the first data in the first object storage bucket in the site in the first geographical region, and configure the first access domain name for the first data. When the tenant located in the second geographical region needs to access the first data, the tenant only needs to send the data access request for the first access domain name to the cloud management platform, and the cloud management platform may pull the first data from the first object storage bucket to the second object storage bucket in the site in the second geographical region, so that the tenant accesses the first data through the second client. It can be learned that, after receiving a data obtaining request (sent through a client) of the tenant, the cloud management platform may automatically initiate a migration task, to implement data migration between sites in different geographical regions for access by the tenant. Because (the client of) the tenant does not perceive a process of migrating data by the cloud management platform, the cloud management platform may replace the tenant to implement automatic data management, to reduce a quantity of operations of the tenant and improve user experience.

In a possible implementation, the upload interface is further configured to receive second data uploaded by the first client, and a first label of the first data and a second label of the second data that are input by the first client, where the first label is the same as the second label, and the cloud management platform further includes a second storage module configured to store the second data in a third object storage bucket, and set a second access domain name for the second data, where the third object storage bucket is set in the site located in the first geographical region, and a second pulling module configured to pull the second data corresponding to the second label the same as the first label from the third object storage bucket to a fourth object storage bucket, where the fourth object storage bucket is set in the site located in the second geographical region.

In a possible implementation, the cloud management platform further includes a third pulling module configured to pull the first data stored in the first object storage bucket in the site in the first geographical region to a fifth object storage bucket, where the fifth object storage bucket is set in a site located in a third geographical region, and a removal module configured to remove the first data stored in the first object storage bucket and the first data stored in the second object storage bucket, where the site located in the third geographical region is a central site, and the site located in the first geographical region and the site located in the second geographical region are edge sites.

In a possible implementation, the cloud management platform further includes a second providing module configured to provide a scheduling policy configuration interface, where the scheduling policy configuration interface is configured to obtain a scheduling policy that is sent by the first client for the first data.

In a possible implementation, the scheduling policy includes a label association policy, and the label association policy records a first label of the first data, and the cloud management platform further includes a fourth pulling module configured to pull, to the object storage bucket in the site in the first geographical region according to the label association policy, data that is stored in an object storage bucket in a site, in another geographical region, different from the site in the first geographical region and for which a label the same as the first label is set.

In a possible implementation, the first label indicates one or any combination of a file type, creation time, a prefix, a suffix, and a size of the first data.

In a possible implementation, the scheduling policy further includes a time policy, and the time policy records scheduling time, and the cloud management platform further includes a fifth pulling module configured to pull, to the object storage bucket in the site in the first geographical region at the scheduling time according to the time policy, the data that is stored in the object storage bucket in the site, in the another geographical region, different from the site in the first geographical region and for which the label the same as the first label is set.

In a possible implementation, the scheduling policy is further for specifying a target site of the first data, and the cloud management platform further includes a third storage module configured to store the first data in an object storage bucket in the target site.

In a possible implementation, the first client and the second client separately use a same account to log in to the cloud management platform, or the first client and the second client separately use mutually associated accounts to log in to the cloud management platform, where the same account or the mutually associated accounts are registered with the cloud management platform.

It should be noted that, content such as information exchange between the modules/units of the apparatus and the implementation processes thereof is based on a same idea as the method embodiments of this disclosure, and achieves same technical effects as the method embodiments of this disclosure. For specific content, refer to the foregoing descriptions in the method embodiments of this disclosure. Details are not described herein again.

Figure 9:
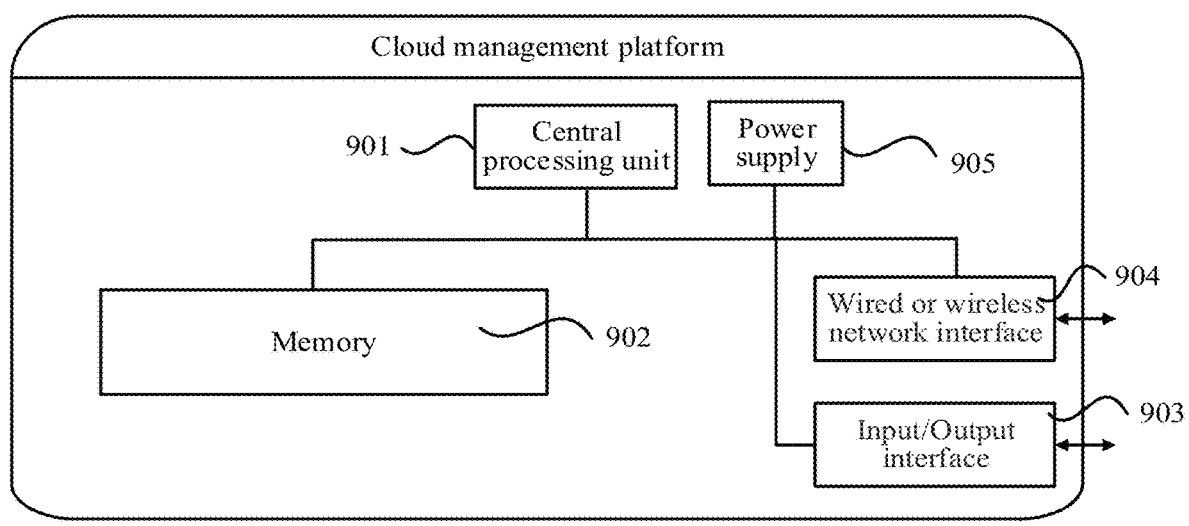
FIG. 9 is another schematic diagram of a structure of a cloud management platform according to an embodiment of this disclosure.

FIG. 9 is another schematic diagram of a structure of a cloud management platform according to an embodiment of this disclosure. As shown in FIG. 9, an embodiment of the cloud management platform may include one or more central processing units 901, a memory 902, an input/output interface 903, a wired or wireless network interface 904, and a power supply 905.

The memory 902 may be used for temporary storage or permanent storage. Further, the central processing unit 901 may be configured to communicate with the memory 902, and perform, on the cloud management platform, a series of instruction operations in the memory 902.

In this embodiment, the central processing unit 901 may perform the method steps in the embodiment shown in FIG. 3. Details are not described herein again.

In this embodiment, specific functional module division in the central processing unit 901 may be similar to division manners of modules such as the first providing module, the second providing module, the first storage module, the second storage module, the third storage module, the receiving module, the first pulling module, the second pulling module, the third pulling module, the fourth pulling module, the fifth pulling module, and the removal module described in FIG. 8. Details are not described herein again.

An embodiment of this disclosure further relates to a computer storage medium, including computer-readable instructions. When the computer-readable instructions are executed, the method steps in the embodiment shown in FIG. 3 are implemented.

An embodiment of this disclosure further relates to a computer program product including instructions. When the computer program product runs on a computer, the computer is enabled to perform the method steps in the embodiment shown in FIG. 3.

A person skilled in the art may clearly understand that, for the purpose of convenient and brief description, for detailed working processes of the foregoing system, apparatus, and unit, refer to corresponding processes in the foregoing method embodiments. Details are not described herein again.

In several embodiments provided in this disclosure, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this disclosure. The foregoing storage medium includes any medium that can store program code, such as a Universal Serial Bus (USB) flash drive, a removable hard disk, a read-only memory (ROM), a random-access memory (RAM), a magnetic disk, or an optical disc.

What is claimed is:

1. A data access-method for an object storage bucket based on implemented by a cloud management platform, wherein the method comprises:
providing an upload interface;
receiving first data through the upload interface and from a first client in a first geographical region;
storing the first data in a first object storage bucket, wherein the first object storage bucket is in a first site located in the first geographical region;
setting a first access domain name for the first data;
receiving from a second client a data access request for the first access domain name, wherein the second client is in a second geographical region; and
pulling, in response to the data access request, the first data from the first object storage bucket to a second object storage bucket for access by the second client, wherein the second object storage bucket is in a second site located in the second geographical region.

2. The method of claim 1, further comprising:
receiving second data, a first label of the first data, and a second label of the second data from the first client and through the upload interface, wherein the first label is the same as the second label;
storing the second data in a third object storage bucket, wherein the third object storage bucket is in the first site;
setting a second access domain name for the second data; and
pulling the second data from the third object storage bucket to a fourth object storage bucket, wherein the fourth object storage bucket is in the second site.

3. The method of claim 1, further comprising:
pulling the first data from the first object storage bucket to a third object storage bucket, wherein the third object storage bucket is in a third site located in a third geographical region; and
removing the first data from the first object storage bucket and the first data from the second object storage bucket, wherein the third site is a central site, and wherein the first site and the second site are edge sites.

4. The method of claim 1, further comprising:
providing a scheduling policy configuration interface; and,
obtaining, through the scheduling policy configuration interface and from the first client, a scheduling policy for the first data.

5. The method of claim 4, wherein the scheduling policy comprises a label association policy for recording a first label of the first data, wherein the method further comprises pulling second data from a third object storage bucket in a third site to a fourth object storage bucket in the first site according to the label association policy, wherein a second label of the second data is set as the first label, and wherein the third site is in a third geographical region and is different from the first site.

6. The method of claim 5, wherein the first label indicates a file type of the first data, a creation time of the first data, a prefix of the first data, a suffix of the first data, or a size of the first data.

7. The method of claim 5, wherein the scheduling policy further comprises a time policy for recording a scheduling time, and wherein the method further comprises further pulling the second data to the fourth object storage bucket at the scheduling time according to the time policy.

8. The method of claim 4, wherein the scheduling policy specifies a target site of the first data, and wherein the method further comprises storing the first data in a third object storage bucket in the target site.

9. The method of claim 1, further comprising registering a same account or mutually associated accounts with the cloud management platform to enable the first client and the second client to separately log in to the cloud management platform.

10. A cloud management platform comprising:
a memory configured to store instructions; and
one or more processors coupled to the memory and configured to execute the instructions to cause the cloud management platform to:
provide an upload interface;
receive first data through the upload interface and from a first client in a first geographical region;
store the first data in a first object storage bucket, wherein the first object storage bucket is in a first site located in the first geographical region;
set a first access domain name for the first data;
receive from a second client a data access request for the first access domain name, wherein the second client is in a second geographical region; and
pull, in response to the data access request, the first data from the first object storage bucket to a second object storage bucket for access by the second client, wherein the second object storage bucket is in a second site in the second geographical region.

11. The cloud management platform of claim 10, wherein the one or more processors are further configured to execute the instructions to cause the cloud management platform to:
a first label of the first data, and a second label of the second data from the first client and through the upload interface, wherein the first label is the same as the second label;
store the second data in a third object storage bucket, wherein the third object storage bucket is in the first site;
set a second access domain name for the second data; and
pull the second data from the third object storage bucket to a fourth object storage bucket, wherein the fourth object storage bucket is in the second site.

12. The cloud management platform of claim 10, wherein the one or more processors are further configured to execute the instructions to cause the cloud management platform to:
pull the first data from the first object storage bucket to a third object storage bucket, wherein the third object storage bucket is in a third site in a third geographical region; and
remove the first data stored in the first object storage bucket and the first data from the second object storage bucket, wherein the third site is a central site, and wherein the first site and the second site are edge sites.

13. The cloud management platform of claim 10, wherein the one or more processors are further configured to execute the instructions to cause the cloud management platform to:
provide a scheduling policy configuration interface; and obtain, through the scheduling policy configuration interface and from the first client, a scheduling policy for the first data.

14. The cloud management platform of claim 13, wherein the scheduling policy comprises a label association policy for recording a first label of the first data, wherein the one or more processors are further configured to execute the instructions to cause the cloud management platform to pull from a third object storage bucket in a third site to a fourth object storage bucket in the first site according to the label association policy, wherein a second label of the second data is set as the first label, and wherein the third site is in a third geographical region and is different from the first site.

15. The cloud management platform of claim 14, wherein the first label indicates a file type of the first data, a creation time of the first data, a prefix of the first data, a suffix of the first data, or a size of the first data.

16. The cloud management platform of claim 14, wherein the scheduling policy further comprises a time policy for recording a scheduling time, and wherein the one or more processors are further configured to execute the instructions to cause the cloud management platform to further pull the second data to the fourth object storage bucket at the scheduling time according to the time policy.

17. The cloud management platform of claim 13, wherein the scheduling policy specifies a target site of the first data, and wherein the one or more processors are further configured to execute the instructions to cause the cloud management platform to store the first data in a third object storage bucket in the target site.

18. The cloud management platform of claim 10, wherein the one or more processors are further configured to execute the instructions to cause the cloud management platform to register a same account or mutually associated accounts with the cloud management platform to enable the first client and the second client to separately log in to the cloud management platform.

19. A computer program product comprising computer-executable instructions that are stored on a computer-readable medium and that, when executed by one or more processors, cause a cloud management platform to:
provide an upload interface;
receive first data through the upload interface and from a first client in a first geographical region;
store the first data in a first object storage bucket, wherein the first object storage bucket is in a first site in the first geographical region;
set a first access domain name for the first data;
receive from a second client a data access request for the first access domain name, wherein the second client is in a second geographical region; and
pull, in response to the data access request, the first data from the first object storage bucket to a second object storage bucket for access by the second client,
wherein the second object storage bucket is in a second site located in the second geographical region.

20. The computer program product of claim 19, wherein when executed by the one or more processors, the computer-executable instructions further cause the cloud management platform to:
receive second data, a first label of the first data, and a second label of the second data from the first client and through the upload interface, wherein the first label is the same as the second label;
store the second data in a third object storage bucket, wherein the third object storage bucket is in the first site;
set a second access domain name for the second data; and
pull the second data from the third object storage bucket to a fourth object storage bucket, wherein the fourth object storage bucket is in the second site.

* * * * *

UNITED STATES PATENT AND TRADEMARK OFFICE
CERTIFICATE OF CORRECTION

PATENT NO. : 12,513,211 B2
APPLICATION NO. : 18/743877
DATED : December 30, 2025
INVENTOR(S) : Pingchang Bai and Zhiyin Chen Page 1 of 1

It is certified that error appears in the above-identified patent and that said Letters Patent is hereby corrected as shown below:

In the Claims

Claim 1, Column 19, Line 12: "A data access-method" should read "A method"

Claim 1, Column 19, Lines 12-13: "method for an object storage bucket based on implemented by" should read "method implemented by"

Claim 11, Column 20, Line 42: "a first label" should read "receive second data, a first label"

Claim 14, Column 21, Line 9: "from a third object" should read "second data from a third object"

Signed and Sealed this
Twenty-seventh Day of January, 2026

John A. Squires
*Director of the United States Patent and Trademark Office*